United States Patent
Iyoki

(10) Patent No.: US 7,155,522 B2
(45) Date of Patent: Dec. 26, 2006

(54) IMAGE INFORMATION TRANSMITTING SYSTEM, SCANNER APPARATUS AND USER TERMINAL APPARATUS, AND METHOD FOR REGISTERING USER TERMINAL INFORMATION TO SCANNER APPARATUS

(75) Inventor: Yutaka Iyoki, Kawasaki (JP)

(73) Assignee: Panasonic Communications Co., Ltd., Fukuoka (JP)

( * ) Notice: Subject to any disclaimer, the term of this patent is extended or adjusted under 35 U.S.C. 154(b) by 648 days.

(21) Appl. No.: 10/057,912

(22) Filed: Jan. 29, 2002

(65) Prior Publication Data

US 2002/0107937 A1    Aug. 8, 2002

(30) Foreign Application Priority Data

Feb. 2, 2001    (JP)    ............. 2001-026646

(51) Int. Cl.
*G06F 15/16* (2006.01)
*H04N 1/46* (2006.01)

(52) U.S. Cl. .............. 709/227; 709/222; 358/505

(58) Field of Classification Search ........... 709/217, 709/222, 223, 225, 227, 237; 358/486–487, 358/505
See application file for complete search history.

(56) References Cited

U.S. PATENT DOCUMENTS

| | | | | |
|---|---|---|---|---|
| 5,911,044 A | * | 6/1999 | Lo et al. .............. | 709/203 |
| 6,052,784 A | * | 4/2000 | Day .................. | 726/22 |
| 6,167,462 A | * | 12/2000 | Davis et al. .......... | 710/5 |
| 6,223,223 B1 | * | 4/2001 | Kumpf et al. ......... | 709/227 |
| 6,256,662 B1 | | 7/2001 | Lo et al. | |
| 6,321,266 B1 | * | 11/2001 | Yokomizo et al. ...... | 709/226 |
| 6,327,613 B1 | * | 12/2001 | Goshey et al. ......... | 709/208 |
| 6,426,946 B1 | | 7/2002 | Takagi et al. | |
| 6,502,128 B1 | * | 12/2002 | Kumpf ............... | 709/221 |
| 6,839,755 B1 | * | 1/2005 | Kumpf et al. ......... | 709/225 |
| 6,880,019 B1 | * | 4/2005 | Toyoda .............. | 709/238 |
| 2001/0014908 A1 | | 8/2001 | Lo et al. | |
| 2001/0021037 A1 | * | 9/2001 | Itoh .................. | 358/1.15 |
| 2001/0021945 A1 | * | 9/2001 | Matsuura ............. | 709/217 |
| 2001/0039587 A1 | * | 11/2001 | Uhler et al. .......... | 709/229 |
| 2002/0038372 A1 | * | 3/2002 | Idehara et al. ........ | 709/227 |
| 2002/0040397 A1 | * | 4/2002 | Choi ................. | 709/226 |
| 2002/0062366 A1 | * | 5/2002 | Roy et al. ............ | 709/224 |
| 2002/0133573 A1 | | 9/2002 | Matsuda et al. | |

FOREIGN PATENT DOCUMENTS

EP    1001584    5/2000

(Continued)

OTHER PUBLICATIONS

English Language Abstract of JP 2001-28655.

(Continued)

*Primary Examiner*—Rupal Dharia
*Assistant Examiner*—Chirag R Patel
(74) *Attorney, Agent, or Firm*—Greenblum & Bernstein, P.L.C.

(57) ABSTRACT

PC broadcasts a search packet on a network (ST505), and waits for the response (ST506). A network scanner receives the search packet and determines whether or not the received search packet is a group name to be responded (ST507). When determining it as the group name to be responded, the network scanner sends back a search response packet to PC (ST509). When receiving the search response packet, PC transmits a registration packet to the network scanner. When receiving the registration packet, the network scanner extracts user terminal information from the registration packet (ST511) and registers it to address notebook data (ST512). After that, the network scanner transmits a registration response packet to PC (ST513).

17 Claims, 12 Drawing Sheets

FOREIGN PATENT DOCUMENTS

| | | |
|---|---|---|
| JP | 09-204515 | 8/1997 |
| JP | 9-233239 | 10/1999 |
| JP | 11-341065 | 12/1999 |
| JP | 2000-244694 | 9/2000 |
| JP | 2001-28655 | 1/2001 |
| JP | 2001-028655 | 1/2001 |

OTHER PUBLICATIONS

English Language Abstract of JP 9-233239.

E. Guttman et al., "Service Location Protocol, Version 2", Jun. 1999.

C. Bettstetter et al., "A Comparison of Service Discovery Protocols and Implementation of the Service Location Protocol", Eunice—Open European Summer School, Sep. 13, 2000.

English Language abstract of JP-2001-028655.

English Language abstract of JP-2000-244694.

English Language abstract of JP-09-204515.

English Language abstract of JP-11-341065.

* cited by examiner

IMAGE INFORMATION TRANSMITTING SYSTEM, SCANNER APPARATUS AND USER TERMINAL APPARATUS, AND METHOD FOR REGISTERING USER TERMINAL INFORMATION TO SCANNER APPARATUS

BACKGROUND OF THE INVENTION

1. Field of the Invention

The present invention relates to an image information transmitting system, a scanner apparatus and a user terminal apparatus, and a method for registering user terminal information to the scanner apparatus.

2. Description of the Related Art

In the conventional network scanners, there is one that uses an e-mail transfer protocol such as SMTP (Simple Mail Transfer Protocol) in performing communication with personal computers (PC). In this case, image information scanned by the network scanner is converted into a file such as a TIFF file and the like and the resultant is attached to an e-mail message.

In order to transmit the e-mail message to PC using SMTP, there are two routes including a route in which the e-mail message is directly transmitted to PC and a route in which the e-mail message is transmitted via a mail server. The image scanner which converts a paper document, which is analog information, into digital image data and stores converted image data in PC is required real time characteristics, so that the former route is preferable.

However, in order to transmit the e-mail message to PC using SMTP directly, it is necessary to use an IP address of PC. Accordingly, a user must examine an IP address of user's own PC. However, knowledge about the network and PC is required to some extent when the user examines it by oneself, and this forces the user to perform complicated operations.

Moreover, there can be considered reduction in time and effort to input addresses by registering an IP address of PC, which is a transmission destination of image information, to the network scanner and calling an IP address of an arbitrary PC based on the content of registration at a transmitting time (scanning time). However, even if this method is used, the user must examine the IP address of PC and input the IP address manually once at least.

Still moreover, in view of the effective use of IP address, there has been recently used a DHCP server that assigns an IP address to a network terminal automatically. Under management of the DHCP server, the IP address to be assigned to PC is different every time startup occurs. Accordingly, the need arises for the user to examine the user's own IP address every time the network scanner is used. Further, the need arises for the user to change the registration content of the network scanner.

In addition to SMTP, a protocol by which image information is directly transmitted to PC from the network scanner can be used, but the same problem as mentioned above occurs in this case.

SUMMARY OF THE INVENTION

It is an object of the present invention is to provide an image information transmitting system, which is capable of easily registering user terminal information such as an IP address of a user terminal apparatus, a scanner apparatus and a user terminal apparatus, and a method for registering user terminal information to the scanner apparatus.

In order to attain the above object, according to the present invention, the scanner apparatus receives a search signal broadcasted on a network from the user terminal apparatus, sends back a response signal including an IP address of at least the scanner apparatus to the user terminal apparatus, receives user terminal information including an IP address of at least the user terminal apparatus sent back to the IP address of the scanner from the user terminal apparatus, and stores it to memory.

This makes it possible for the user of user terminal apparatus to register user terminal information such as the IP address of user terminal apparatus to the scanner apparatus without examining the IP address by oneself.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

An preferred embodiment of the present invention will be specifically described with reference to the accompanying drawings herewith.

Figure 1:
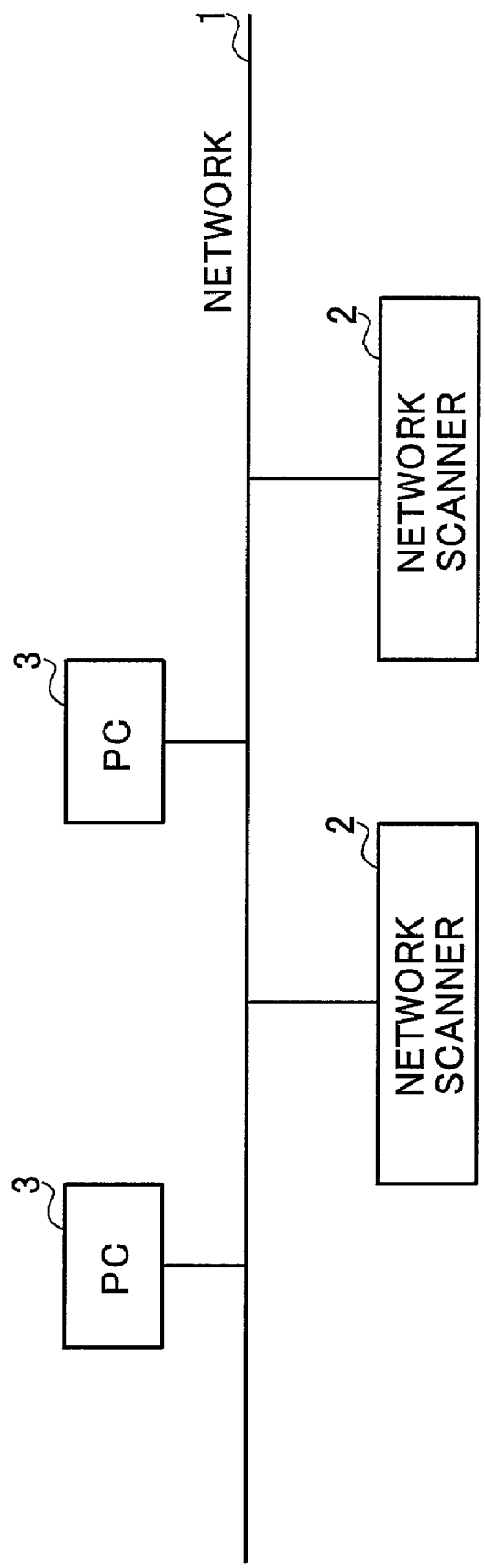
FIG. 1 is a schematic view illustrating a network system where a network scanner operates according to one embodiment of the present invention.

FIG. 1 is a schematic view illustrating a network system where a network scanner operates according to one embodiment of the present invention.

A plurality of network scanners 2 and a plurality of PCs 3, which are user terminals each using the network scanner, are connected to a network 1 such as LAN.

Figure 2:
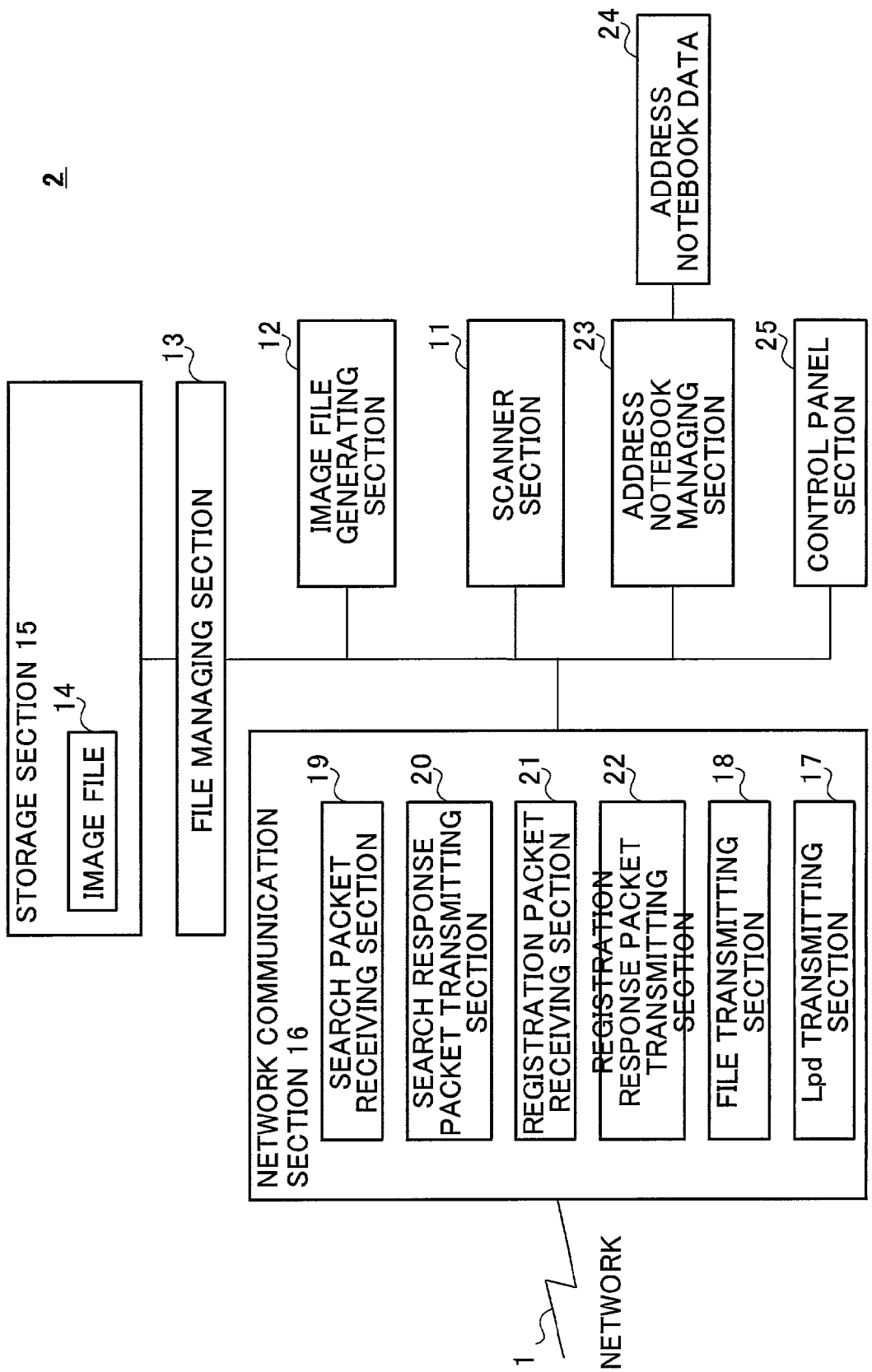
FIG. 2 is a block diagram illustrating the function of the network scanner according to the above embodiment.

FIG. 2 is a block diagram illustrating the function of the network scanner according to the above embodiment.

In the network scanner 2, a scanner section 11 scans a document to obtain an image signal. An image file generating section 12 generates an image file from the image signal output by the scanner section 11. A data format of the image file maybe, for example, TIFF, GIF, JPEG and the like, and TIFF is used in this example. A file managing section 13 stores this image file 14 to a storage section 15.

A network communication section 16 is connected to a network 1 by a network connection interference circuit (not shown) to perform communication with PC3 via network 1. In the network communication section 16, an Lpd transmitting section 17 executes an Lpr/Lpd protocol between an Lpd receiving section 33 of PC3 to be described later and the Lpd transmitting section 17. A file transmitting section 18 executes the processing for transferring the image file 14 to PC3 using file managing section 13 through this Lpr/Lpd protocol procedure.

Moreover, in the network communication section 16, a search packet receiving section 19 receives a search packet transmitted by PC3 to be described later. A search response packet transmitting section 20 transmits a search response packet, which is a response to the search packet received by the search packet receiving section 19, to PC3.

Moreover, a registration packet receiving section 21 receives a registration packet transmitted by PC3 to be described. On the other hand, a registration response packet transmitting section 22 transmits a registration response packet, serving as a response to the registration packet, to PC3.

The functions of the respective sections of the forgoing network communication section 16 are implemented by software executed by CPU in this example, but they are not limited to this.

An address notebook managing section 23 manages address notebook data 24 in which user terminal information is registered to be described later. A control panel 25 is used to read an IP address of transmission destination from the address notebook data 24 or to manually input an IP address in an unregistered case.

Figure 3:
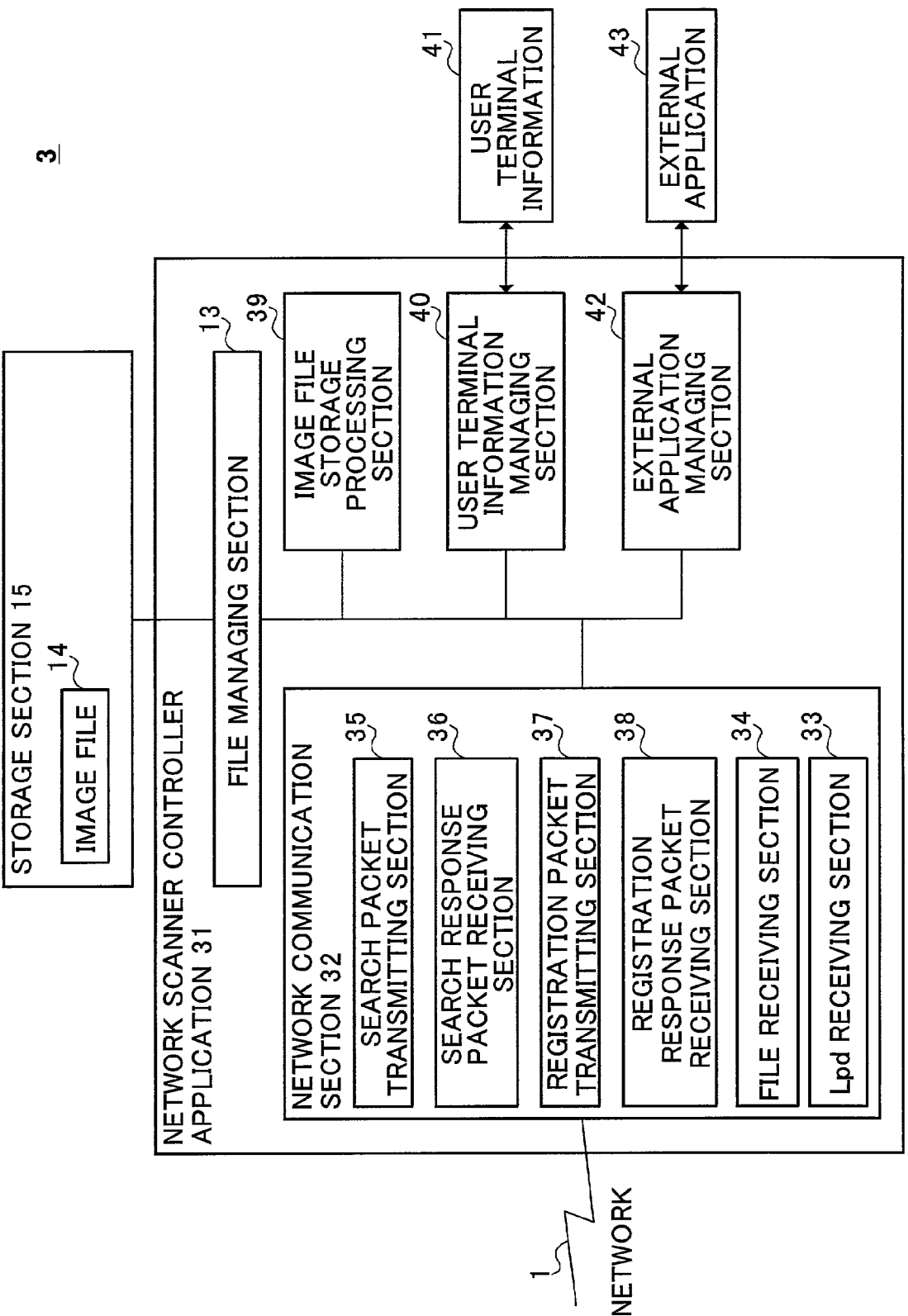
FIG. 3 is a block diagram illustrating the function of a personal computer according to the above embodiment.

FIG. 3 is a block diagram illustrating the function of a personal computer according to the above embodiment.

PC 3 executes a network scanner controller application 31 that controls image scanning processing using the network scanner 2. In this network scanner controller application 31, a network communication section 32 performs communication with the foregoing network scanner 2. In this network communication section 32, an Lpd receiving section 33 executes an Lpr/Lpd protocol between the Lpd transmitting section 17 of the foregoing network scanner 2 and the Lpd receiving section 33. A file receiving section 34 executes processing for receiving the image file from the network scanner 2 through this Lpr/Lpd protocol procedure.

Moreover, in the network communication section 32, a search packet transmitting section 35 transmits a search packet on the network 1. A search response packet receiving section 36 receives a search response packet responded to this search packet.

An image file storage processing section 39 stores the image file 14 received by the file receiving section 34 to the storage section 15. The file managing section 13 manages the image file stored to the storage section 15.

Moreover, a registration packet transmitting section 37 generates a registration packet from user terminal information 41 managed by a user terminal information managing section 40, and transmits the generated registration packet to the network scanner 2. A registration response packet receiving section 38 receives a registration response packet responded to the registration packet.

An external application managing section 42 manages an external application 43, which is executed by PC3. This external application 43 includes an image viewer such as TIFF viewer, Adobe Photoshop (trademark of Adobe Corporation) and an image edit application.

In place of the network scanner controller application 31 having such functions, a circuit equipped with the equivalent functions may be possible.

Lpr/Lpd protocol used in communication between the network scanner 2 and PC3 is a communication protocol, which is used to transmit/receive print data between hosts using UNIX as OS. In this Lpr/Lpd protocol, the host, which wishes to receive print service, outputs a request to a line printer daemon (Lpd), which is executed on a certain host. The daemon, which has received the request, accepts it as a job, and queues it to perform processing.

Figure 4:
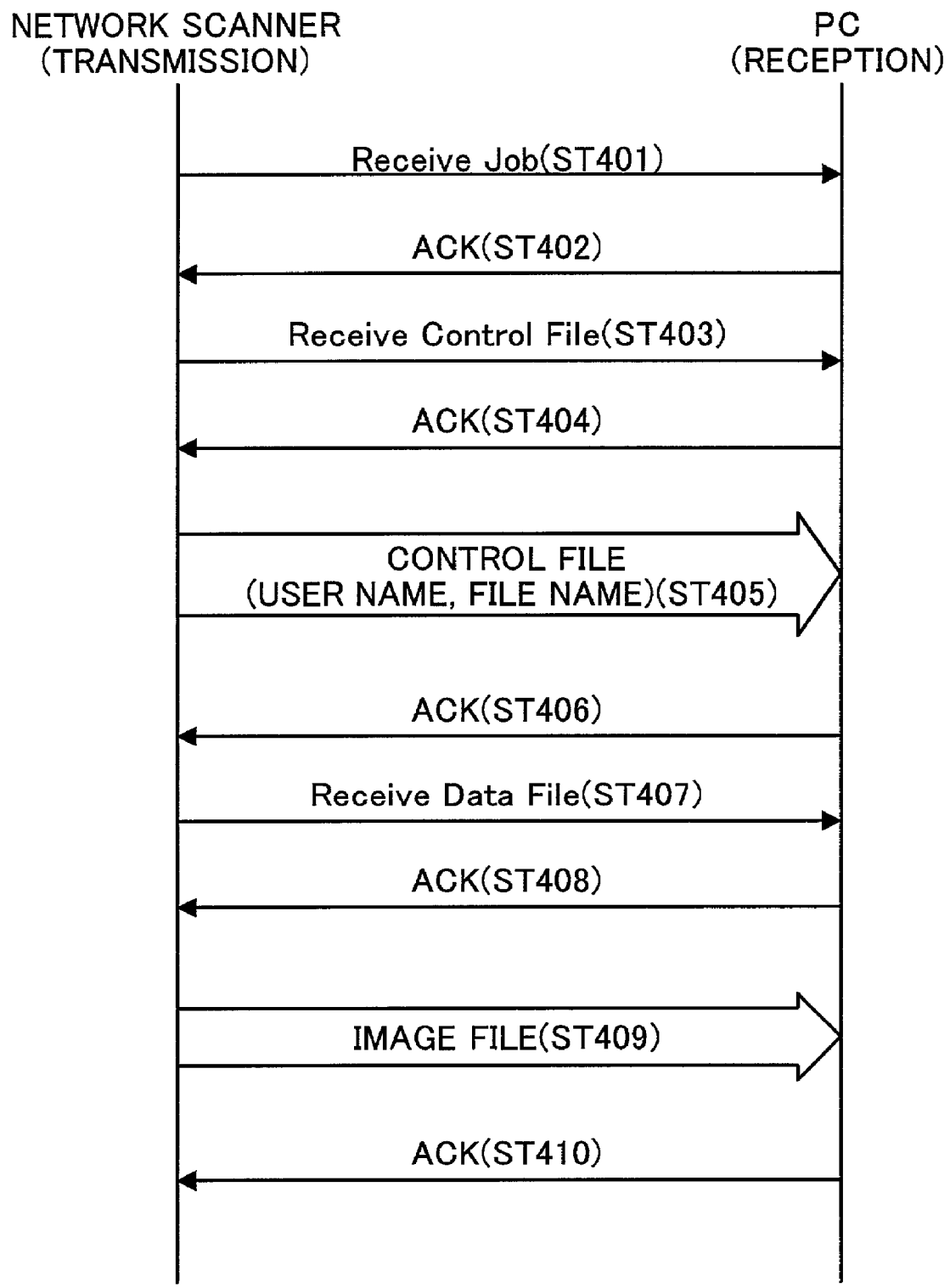
FIG. 4 is a sequence view illustrating an image file transfer carried out between the network scanner and the personal computer according to the above embodiment.

FIG. 4 is a sequence view illustrating an image file transfer carried out between the network scanner and the personal computer according to the above embodiment.

As illustrated in FIG. 4, the sender's network scanner 2 transmits a command "Received Job" instructing the reception of job to PC3 (ST401). In response to this, if PC3 sends back ACK to the network scanner 2 (ST402), the sender's network 2 transmits a sub-command "Receive control file" instructing the reception of control file to PC3 (ST403). This sub-command includes the size of control file and the name of control file name.

In response to this, if PC3 sends back ACK to the network scanner 2 (ST404), the network scanner 2 transmits the control file to PC3 (ST405). This control file includes a user name, a file name of image file, and the like.

Next, if PC3 completes the reception of control file and sends back ACK to the network scanner 2 (ST406), the network scanner 2 transmits a sub-command "Receive data file" representing the transmission of image file to PC3 (ST407). When confirming that PC3 has sent back ACK to the network scanner 2 (ST408), the network scanner 2 transmits an image file (TIFF file) to PC3 (ST409). If the reception of image file is completed, PC3 sends back ACK to the network scanner 2 (ST410).

Since the foregoing Lpr/Lpd protocol used in the image file transfer is based on TCP, the transmission/reception of command, sub-command, control file and data file is carried out on not a packet-by-packet basis but a stream-by-stream basis. In other words, connection between the network scanner 2 and PC3 is established and then communication is carried out. Such a communication protocol is referred to as a connection type communication protocol, and an ftp protocol can be used in addition thereto. Accordingly, in order to perform data transmission to PC3 from the network scanner 2, the network scanner 2 must know the IP address of PC3 at the transmitting time. Moreover, in order to register the IP address to address notebook data 24 together with the user name, the network scanner 2 must obtain the IP address and other relevant information (hereinafter referred to as user terminal information).

Figure 5:
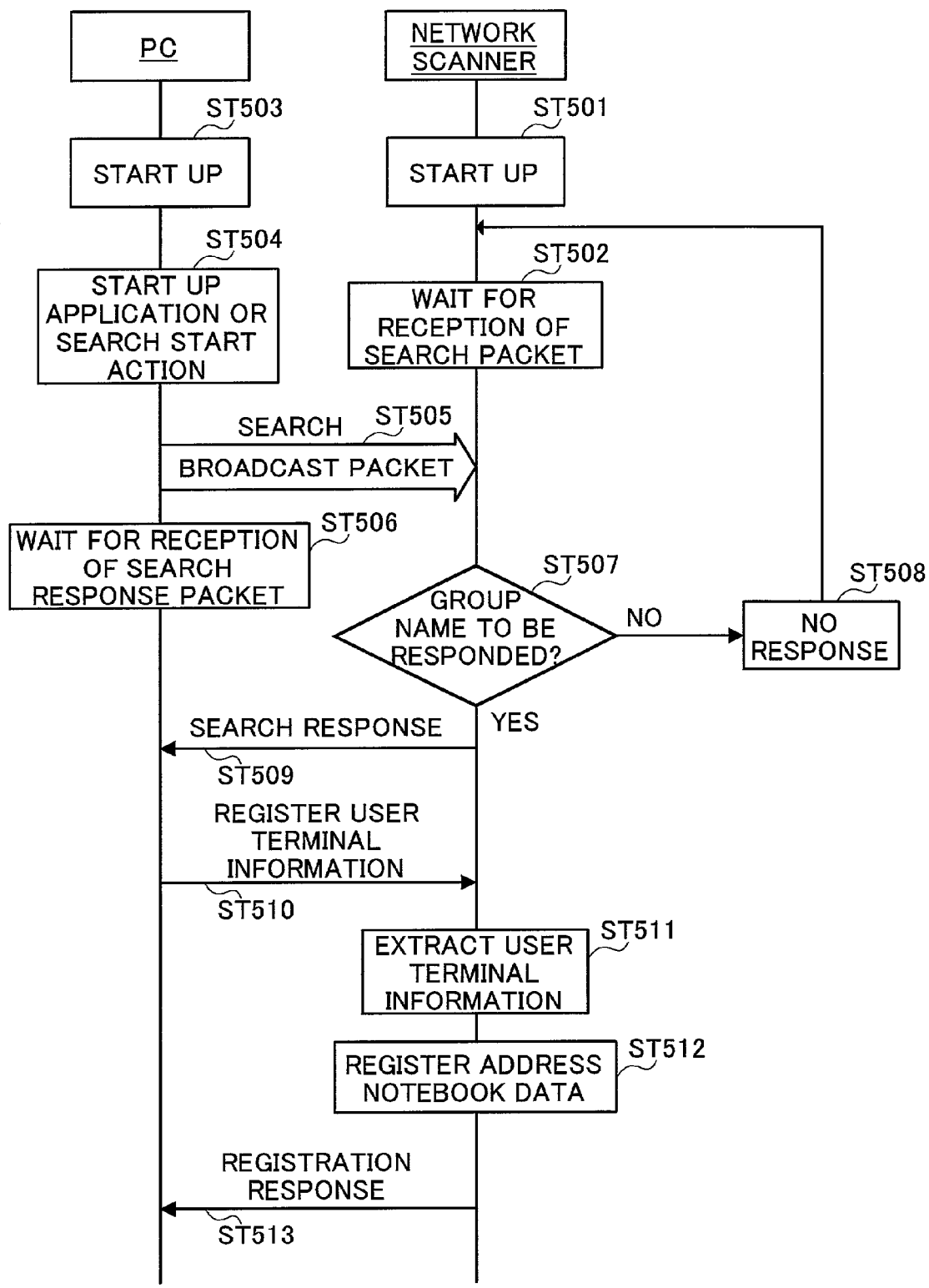
FIG. 5 is a flowchart illustrating a user terminal information registration operation carried out between the network scanner and the personal computer according to the above embodiment.

The following will explain an IP address obtaining method at the network scanner according to the present embodiment. FIG. 5 is a flowchart illustrating a user terminal information registration operation carried out between the network scanner and the personal computer according to the above embodiment.

When the network scanner 2 is started up (ST501), the search packet receiving section 19 monitors a packet with a specific port number on the network 1 (ST502)

On the other hand, when PC3 is started up (ST503) PC3 detects the startup of network scanner controller application 31 or the reception of search start action (instruction of user registration) (ST504), and the search of the network scanner 2 on the network 1 is carried out in the following manner. First, the search packet transmitting section 35 broadcasts the search packet on the network 1 (ST505) and waits for the response (ST506).

Figure 6:
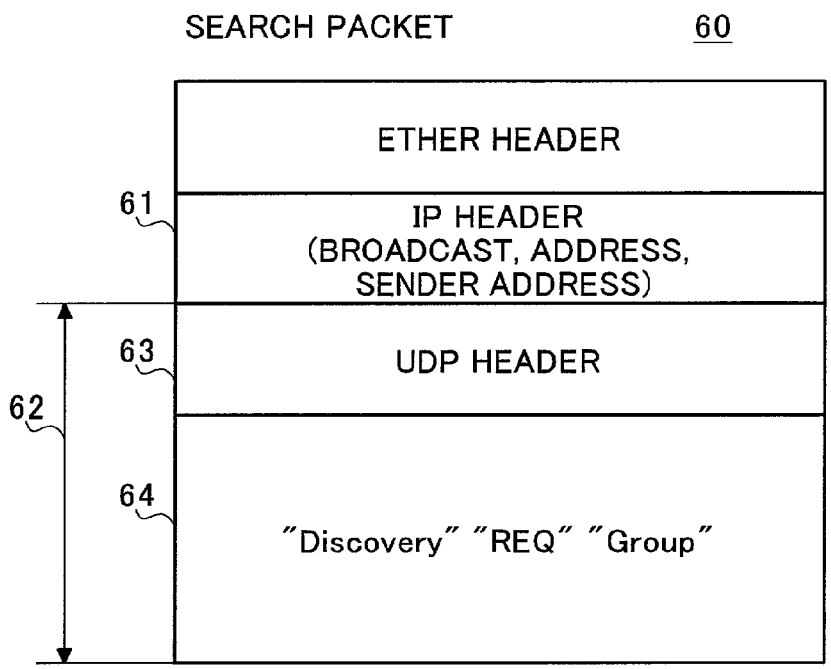
FIG. 6 is a view showing a frame format of a search packet according to the above embodiment.

FIG. 6 is a view showing a frame format of a search packet according to the above embodiment. A UDP packet is used as a search packet 60. At an IP heater 61 of the search packet 60, a broadcast address (for example, 255.255.255.255) is specified in a destination address field and IP address of PC3 is specified in a sender address field.

Moreover, at an UDP header 63, which is positioned at the top of an IP data field 62, the same port number that the search packet receiving section 19 of the network scanner 2 monitors is specified as a destination port number.

Still moreover, an UDP data field 64 includes various kinds of information indicating that this packet is a search packet. Namely, the UDP data field 64 includes information "Discovery" indicting that this packet relates to an automatic registration of user terminal information, information "REQ" indicating that this packet relates to a processing request, and information "Group" indicating a group name to which the sender of the packet belongs.

Since a UDP protocol is a connectionless type communication protocol that does not have to establish the connection unlike the TPC protocol, it is suitable for searching the network scanner 2.

The search packet receiving section 19 of the network scanner 2 receives the search packet 60, recognizes information "Group", and determines whether or not this is the group name to which a response should be given (507). For example, if the group name matches the name of a group to which the search packet receiving section 19 belongs, the search packet receiving section 19 determines that a response should be given. If it does not match, the search packet receiving section 19 determines that a response should not be given. In the case where it is determined that a response should not be given, the network scanner returns to a search packet waiting state without giving any response (ST508). On the other hand, in the case where it is determined that a response should be given, the search response packet transmitting section 20 sends back the search response packet to PC3 (ST509). In the case where PC3 transmits the search packet 60 including no information "Group", the network scanner 2 determines that this is the search from the other group and gives a response without fail.

Figure 7:
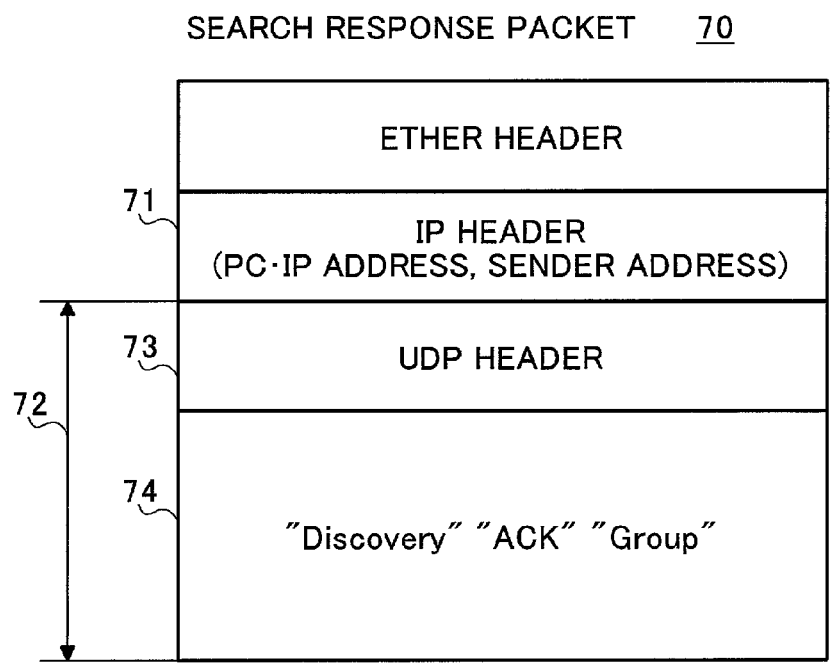
FIG. 7 is a view showing a frame format of a search response packet according to the above embodiment.

FIG. 7 is a view showing a frame format of a search response packet according to the above embodiment. A UDP packet is used as this search response packet 70. At an IP heater 71 of the search packet 70, a sender of the search packet 60, that is, an IP address of PC3 (hereinafter referred to as PC. IP address) is specified in a destination address field and an IP address of the network scanner 2 is specified in a sender address field.

Moreover, at an UDP header 73, which is positioned at the top of an IP data field 72, the same port number that the search response packet receiving section 36 of PC 3 monitors is specified as a destination port number.

Still moreover, an UDP data field 74 includes various kinds of information indicating that this packet is a search response packet. Namely, at the search packet 60 shown in FIG. 6, information "ACK" indicating that the packet relates to a processing response is used in place of information "REQ" indicating that the packet relates to a processing request.

When PC3 receives the search response packet 70, the registration packet transmitting section 37 of PC3 transmits the registration packet to the network scanner 2.

Figure 8:
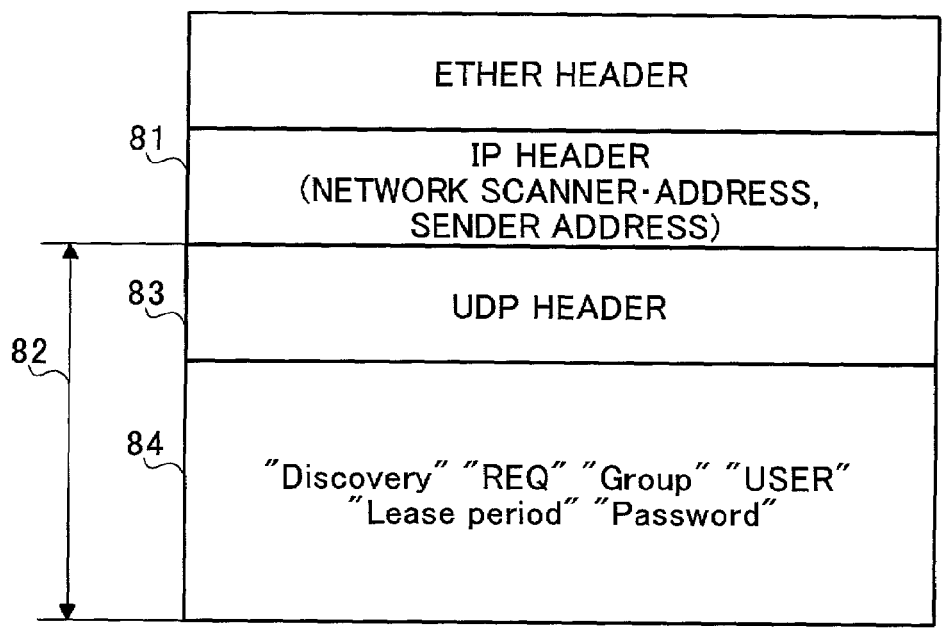
FIG. 8 is a view showing a frame format of a registration packet according to the above embodiment.

FIG. 8 is a view showing a frame format of a registration packet according to the above embodiment. A UDP packet is used as this registration packet 80. At an IP heater 81 of the registration packet 80, the IP address of the network scanner 2 that has sent back the search response packet 70 is specified in the destination address field. Moreover, an IP address of PC3 is specified in the sender address field.

Moreover, at an UDP header 83, which is positioned at the top of an IP data field 82, the same port number that the registration packet receiving section 21 of the network scanner 2 monitors is specified as a destination port number.

Still moreover, an UDP data field 84 includes information "USER" indicative of a user name, information "Lease period" indicative of effective time (lease period) of user terminal information (particularly, IP address) and information "Password" indicative of a password specified by the user, in addition to information "Discovery", "REQ" and "Group."

When the registration packet receiving section 21 of the network scanner 2 receives the registration packet 80, the address notebook managing section 23 extracts user terminal information from the registration packet 80 (ST511), and registers it to address notebook data 24 (ST512). Thereafter, the registration response packet transmitting section 22 transmits a registration response packet 90 to PC3 to inform PC3 that registration has completed (ST513).

Figure 9:
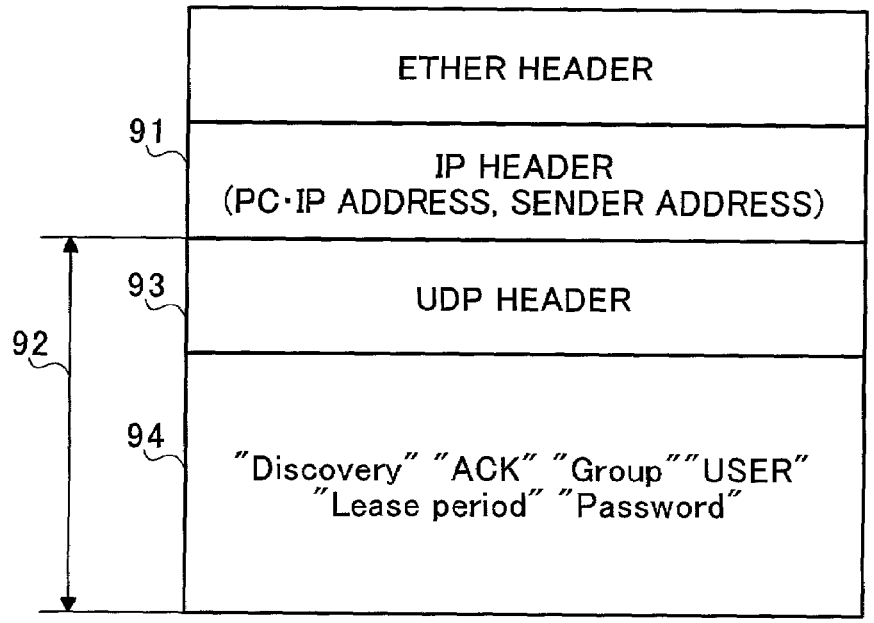
FIG. 9 is a view showing a frame format of a registration response packet according to the above embodiment.

FIG. 9 is a view showing a frame format of a registration response packet according to the above embodiment. A UDP packet is used as this registration packet 90. At an IP heater 91 of the registration packet 90, a sender of the registration packet 80, that is, a PC. IP address is specified in the destination address field. Moreover, an IP address of the network scanner 2 is specified in the sender address field.

Moreover, at an UDP header 93, which is positioned at the top of an IP data field 92, the same port number that the registration response packet receiving section 38 of PC3 monitors is specified as a destination port number.

Still moreover, an UDP data field 94 includes various kinds of information indicating that this packet is a registration response packet. Namely, at the registration packet 80 shown in FIG. 8, information "AKC" indicating that the packet relates to a processing response is used in place of information "REQ" indicating that the packet relates to a processing request.

A further explanation will be given of the operations of the network scanner 2 and PC3 in the foregoing flow of the user terminal information registration.

Figure 10:
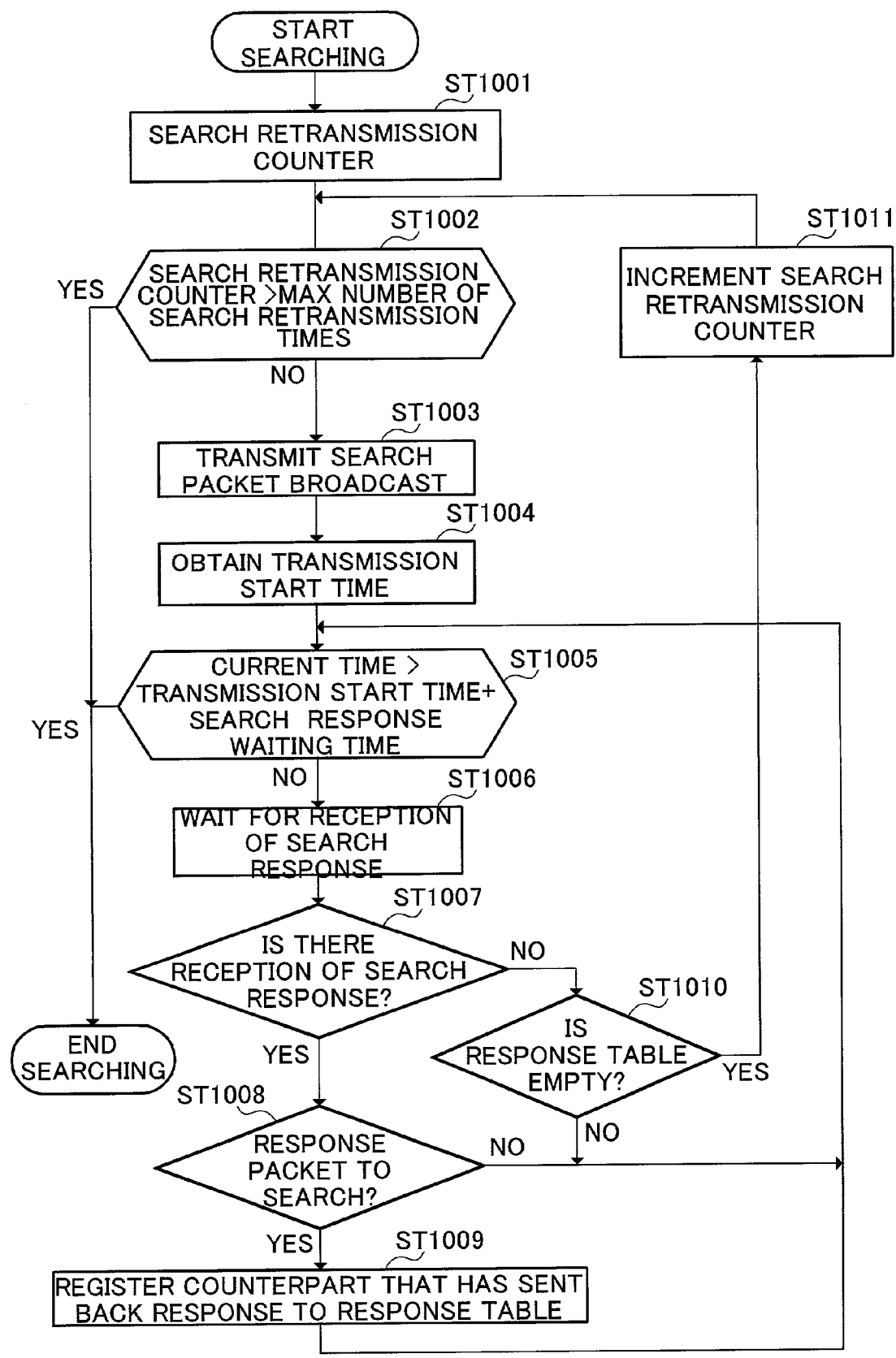
FIG. 10 is a flowchart illustrating steps for search processing of the network scanner by the personal computer according to the above embodiment.

FIG. 10 is a flowchart illustrating steps for search processing of the network scanner by the personal computer according to the above embodiment.

PC3 resets a search retransmission counter to zero (ST1001). Next, PC3 determines whether or not the search retransmission counter exceeds a maximum number of search retransmission times (ST1002). Since the search retransmission counter=0 at first, the determination result is "NO" and processing goes to ST1003. In ST1003, PC3 broadcasts the search packet 60 on the network 1. Next, PC 3 obtains transmission start time from a built-in timer of PC3 (ST1004). After that, PC 3 determines whether or not current time (obtained from the built-in timer) is greater than the sum of transmission start time and a total amount of search response waiting time, that is, whether or not a predetermined total amount of search response waiting time has elapsed since broadcast transmission (ST1003) (ST1005).

In the case where the result in ST1005 is "NO", PC3 waits for the reception of search response until predetermined search response waiting time per one time elapses (ST1006). PC3 determines whether or not the search response packet 70 is received while waiting for the reception (ST1007). In the case where the determination result is "YES", PC3 determines whether or not the received search response packet 70 is one that responds to the search packet 60 transmitted by PC3 (ST1008). This can be carried out by, for example, determining whether information of the UDP data field of the search response packet 70 is "Discovery" and the processing response is "ACK" or not. In the case where the determination result is "YES", the IP address of network scanner 2 obtained from the search response packet 70 is registered to a response table (ST1009). After registration, processing goes back to ST1005.

If the determination result is "NO" in ST1008, the received search response packet 70 is not one that responds to the search packet 60 transmitted by PC3 so that the search response packet 70 is abandoned and processing goes back to ST1005.

In the case where the determination result is "NO" in ST1007, that is, no search response packet 70 is received, PC3 determines whether or not the response table is empty (ST1010). Here, in the case where the determination result is "YES", the search packet 60 disappears on the network 1 for some reason and does not reach any network scanner 2 in some cases. For this reason, in order to retransmit the search packet 60, the search retransmission counter is incremented by one (ST1011) and processing goes back to ST1002. Sequentially, after determining whether or not the search retransmission counter exceeds a maximum value in ST1002, processing in ST1003 to ST1009 is repeated. Accordingly, the retransmission of search packet 60 is carried out up to the maximum number of the search retransmission times.

On the other hand, if the determination result in step ST1010 is "NO", the search packet 60 is effectively transmitted, so that processing goes back to ST1005. Then, processing in ST1006 to ST1009 is repeated, so that PC3 waits for a response from the network scanner 2 until time that has elapsed since broadcast transmission (ST1003) reaches the total amount of search response waiting time.

In this way, PC3 can search all available network scanners 2, which exist on the network 1, and obtain the corresponding IP addresses. Moreover, PC3 can search the network scanners 2 without fail even if the search packet disappears or delay in response time of network scanner 2 occurs.

On the other hand, an explanation will be given of the operation of network scanner 2 while PC3 searches the network scanner 2.

Figure 11:
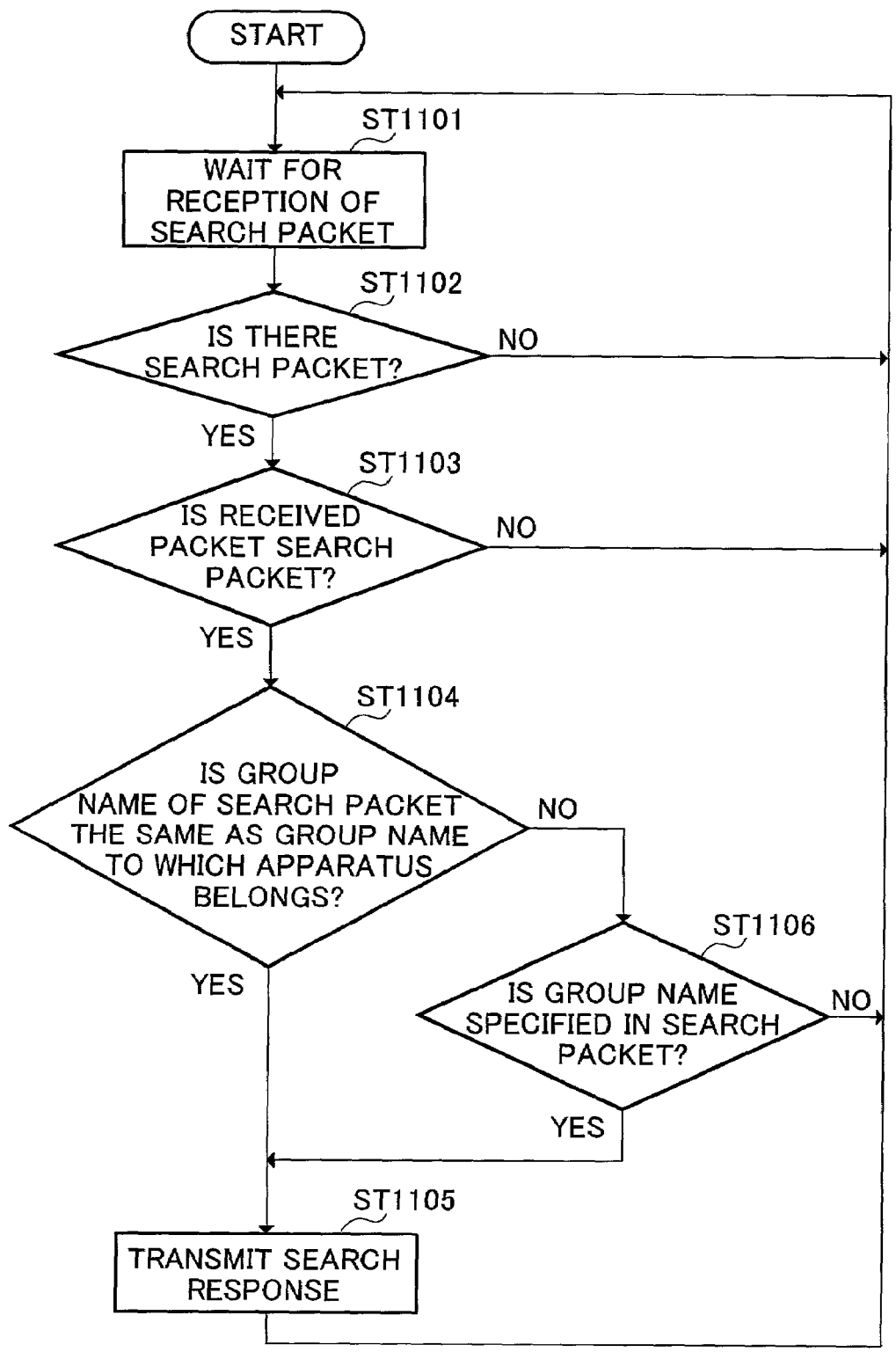
FIG. 11 is a flowchart illustrating steps for responding to the search from the personal computer by the network scanner according to the above embodiment.

FIG. 11 is a flowchart illustrating steps for responding to the search from the personal computer by the network scanner according to the above embodiment.

The network scanner 2 normally waits for the reception of search packet 60 from PC3 (ST1101). If the network scanner 2 receives the packet (ST1102), the network scanner 2 checks whether or not the received packet is search packet 60 (ST1103). If "Discovery" and "REQ" are included in the received packet as illustrated in FIG. 6, the network scanner 2 determines that the received packet is search packet 60.

If the received packet is search packet 60 (YES) in ST1103, the network scanner 2 recognizes the group name of PC3 from information "Group" included in the search packet 60, and checks whether or not the group name matches the name of the group to which the network scanner 2 belongs (ST1104). If they match each other (YES), the network scanner 2 prepares the search response packet 70 including the IP address of the network scanner 2 and transmits it to PC3 (ST1105). If they do not match (NO), the network scanner 2 checks whether or not the search packet 60 includes information "Group" (ST1106). If the search packet does not include information "Group" (YES), the network scanner 2 determines that this is the search from the other group, and processing moves to ST1105 to transmit the search response packet 70. While, if the result is NO, the network scanner 2 abandons the packet and goes back to ST1101. In this way, the network scanner 2 responds to the search from PC3 and notifies PC3 of the IP address of the network scanner 2.

An explanation will be next given of steps for registering user terminal information to the network scanner 2 by PC3.

Figure 12:
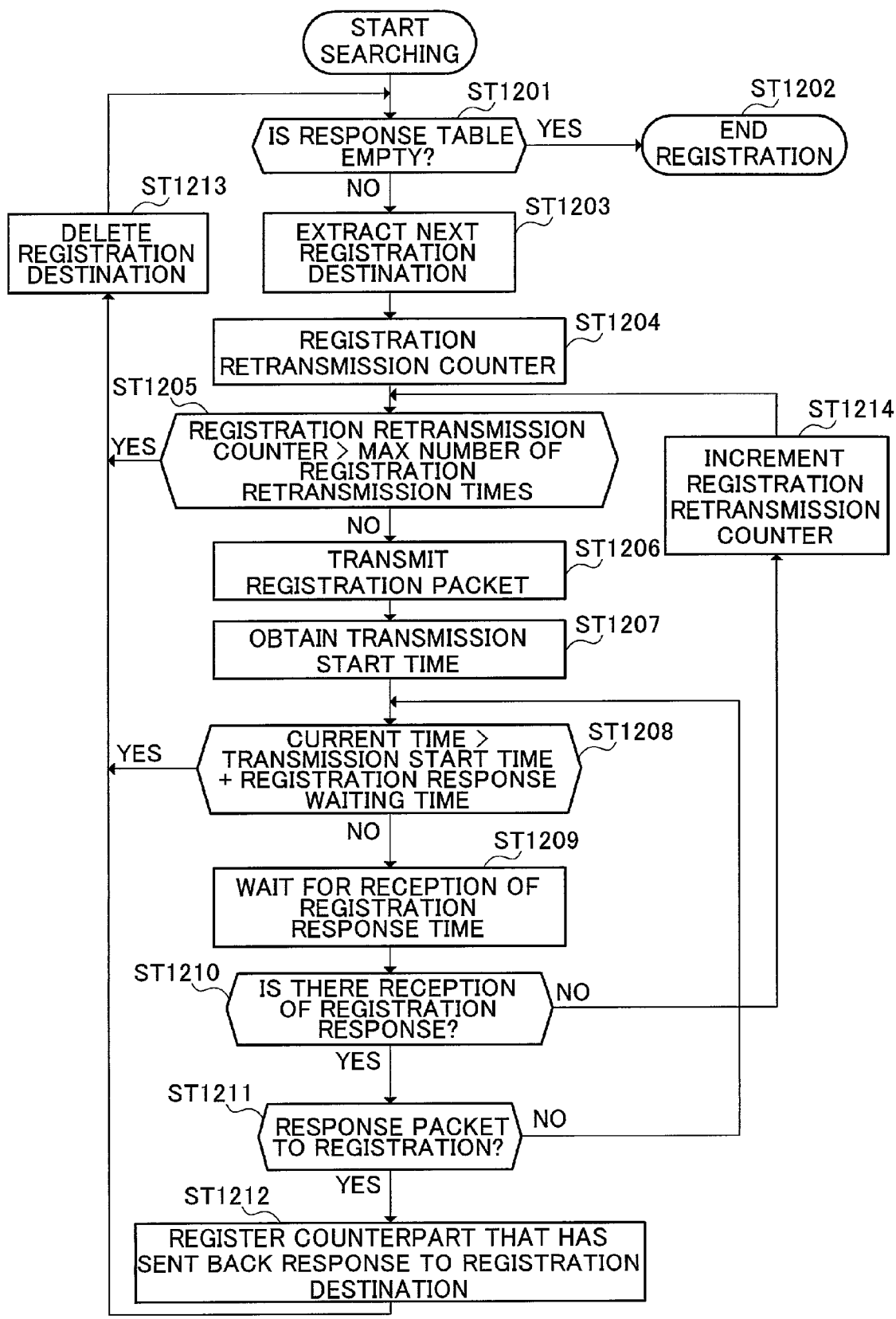
FIG. 12 is a flowchart illustrating steps for registering user terminal information to the network scanner in the personal computer according to the above embodiment.

FIG. 12 is a flowchart illustrating steps for registering user terminal information to the network scanner in the personal computer according to the above embodiment.

PC3 determines whether or not a response table is empty (ST1201). If it is empty (YES), PC3 ends the registration steps (ST1202). If it is not empty (NO), PC3 extracts the IP address (registration destination) of a first network scanner 2 from the top of the response table (ST1203). Next, PC3 resets a registration retransmission counter to zero (ST1204). After that, PC3 determines whether or not the registration retransmission counter exceeds a maximum number of registration retransmission times (ST1205). If the determination result is NO, PC3 prepares a registration packet 80 shown in FIG. 8 and transmits it to the network scanner 2 (ST1206).

After transmitting the registration packet 80, the PC3 obtains transmission start time from the built-in timer of PC3 (ST1207). Next, PC 3 determines whether or not current time is greater than the sum of transmission start time and a total amount of registration response waiting time, that is, whether or not a predetermined total amount of registration response waiting time has elapsed since the start of transmission (ST1208).

In the case where the result in ST1208 is "NO", PC3 waits for a registration response packet 90 from the network scanner 2 until predetermined registration response waiting time per one time elapses (ST1209). After that, PC3 determines whether or not the registration response packet 90 is received (ST1210). If the determination result is "YES", PC3 determines whether or not the registration response packet 90 is one that responds to the registration packet 80 transmitted by PC3 (ST1211). If the determination result is "YES" in ST1211, PC3 extract the IP address of network scanner 2, which has responded, from the registration response packet 90, and registers it to a registration destination table (ST1212). After deleting the registration destination from the registration destination table (ST1213), processing goes back to ST1201 to carry out steps for registering user terminal information to a next registration destination.

On the other hand, if the determination result is "NO" in ST1210, since there is a possibility that the registration packet 80 will disappear, the registration retransmission counter is incremented by one (ST1214), and processing goes to ST1205. Then, PC3 confirms whether or not the registration retransmission counter exceeds the maximum number, and retransmits the registration packet 80, and processing in steps 1206 to 1212 is repeated. Moreover, in the case where the determination result is "NO" in ST1211, PC3 abandons the registration response packet 90 and goes back to ST1208, and processing in ST1209 to 1212 is repeated. In this way, there is a case in which the value of the registration retransmission counter exceeds a maximum number of registration retransmission times in ST1205. Or, there is a case in which elapsed time since the transmission of registration packet exceeds the total amount of registration response waiting time in ST1208. In either case, the registration destination is in a state that it cannot response for the reason of power-down of the source of registration destination. For this reason, PC3 abandons the registration to the registration destination and moves to steps for registration to a next registration destination. In this way, PC3 performs the registration of user terminal information to all registration destinations registered in the response table.

Figure 13:
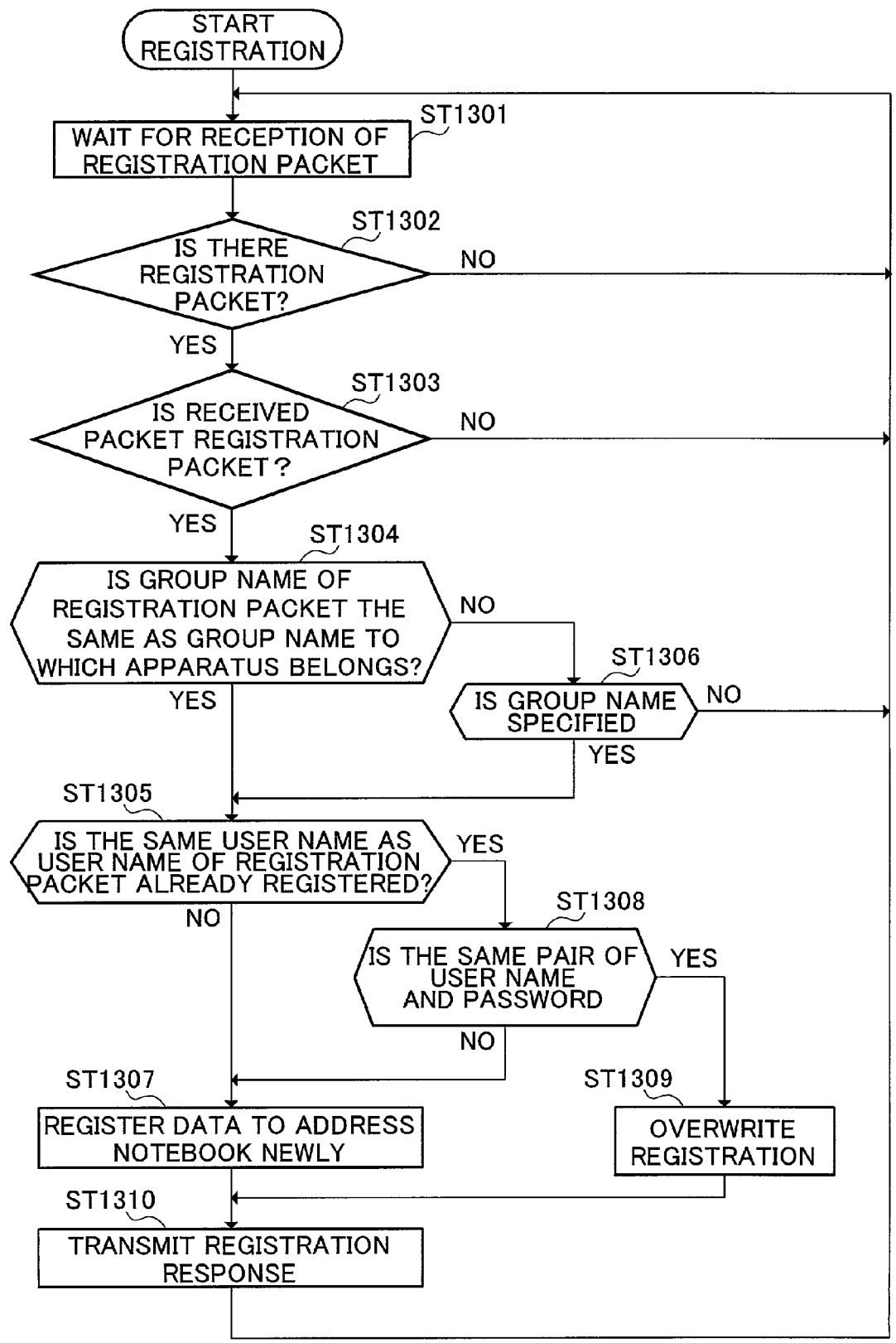
FIG. 13 is a flowchart illustrating steps for responding to the user registration from the personal computer by the network scanner according to the above embodiment.

FIG. 13 is a flowchart illustrating steps for responding to the user registration from the personal computer by the network scanner according to the above embodiment.

The network scanner 2 normally waits for the reception of registration packet 80 from PC3 (ST1301). If the network scanner 2 receives the packet (ST1302), the network scanner 2 checks whether the received packet is the registration packet 80 or not (ST1303). If "Discovery", "REQ" and "USER" are included in the received packet as illustrated in FIG. 8, the network scanner 2 determines that the received packet is the registration packet 80.

If the received packet is the registration packet 80 (YES) in ST1303, the network scanner 2 recognizes the group name of PC3 from information "Group" included in the registration packet 80, and checks whether or not the group name matches the name of the group to which the network scanner 2 belongs (ST1304). If they match each other (YES), processing goes to ST1305. While, if they do not match (NO), the network scanner 2 checks whether or not information "Group" is included in the registration packet 80 in ST1306. If it is not included therein (YES), the network scanner 2 determines that this is the request for registering user terminal information from the other the group, and processing moves to ST1305.

In ST1305, the network scanner 2 searches address notebook data 24 using information "USER" included in the registration packet 80, and checks whether or not the same user name is already registered. If the result is "NO", the network scanner 2 newly registers user terminal information such as a user name extracted from the registration packet 80, PC. IP address, group name, password and the like to address notebook data 24 (ST1307).

On the other hand, if the result is "YES", the network scanner 2 checks whether or not the user name and password, which are already registered as user terminal information, match the user name and password, which are indicated by each of information "USER" and "Group" included in the registration packet 80 (ST1308). If the result is "YES" in ST1308, the network scanner 2 determines that both are the same and overwrites the existing user terminal information onto address notebook data 24 using user terminal information extracted from the registration packet 80 (ST1309). On the other hand, if the result is "NO", the network scanner 2 determines that both are not the same and newly registers user terminal information to address notebook data 24 (ST1307). This prevents user terminal information from being erroneously overwritten.

When the registration in ST1307 or ST1309 is ended, the network scanner 2 prepares the registration response packet 90 and transmits it to PC3 (ST1310), and returns to a reception waiting state for registration packet 80 (ST1301). As is appreciated from the foregoing description, the network scanner 2 extracts user terminal information upon receiving the registration packet 80 from PC3, making it possible to newly register the extracted user terminal information to address notebook data or update it.

The following will explain the steps in which the network scanner 2 scans a document and transmits digital image data to PC3 using user terminal information registered to the network scanner 2 from PC3 as mentioned above.

Figure 14:
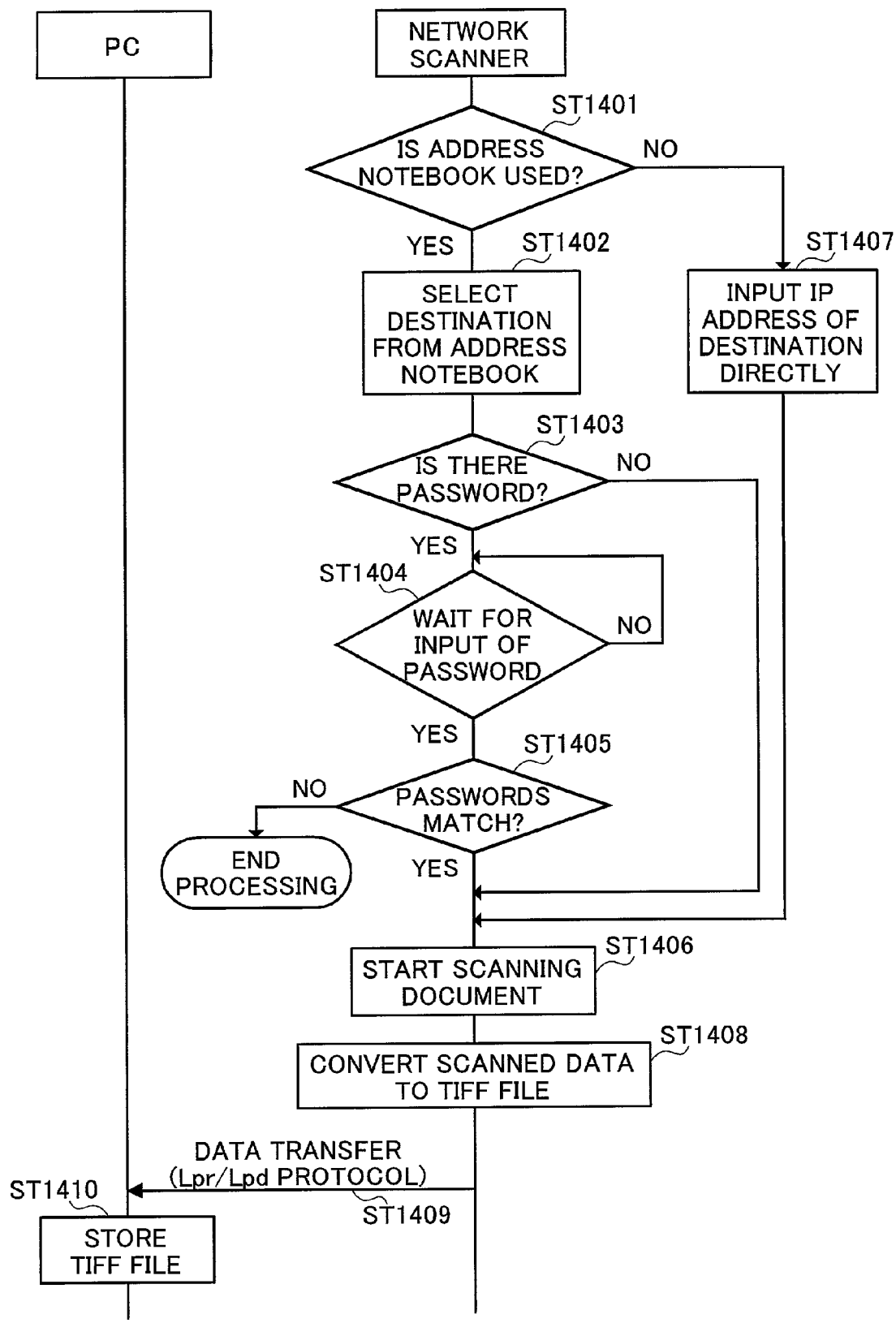
FIG. 14 is a flowchart illustrating steps for transmitting digital image data between the network scanner and the personal computer according to the above embodiment.

FIG. 14 is a flowchart illustrating steps for transmitting digital image data between the network scanner and the personal computer according to the above embodiment.

First, the network scanner 2 selects whether or not the address notebook is used in order to specify a transmission destination of digital image data (ST1401). The network scanner 2 carries out this selection by selecting an address notebook menu from menus. In the case where the use of address notebook is selected in ST1401 (YES), the network scanner 2 displays the user name registered to address notebook data 24 on an LCD provided at the control panel 25, and instructs the user to select the user name (ST1402). If the user name is selected, the IP address of PC3 registered to address notebook data 24 to be associated with this user name is called up and specified as a destination.

Sequentially, the network scanner 2 determines whether or not the password is registered to be associated with the specified IP address (ST1403). If the result is YES, the network scanner 2 displays a message of a request for inputting a password on LCD, and waits for the entry of password (ST1404). If the password is input, the input password is checked against the password registered to address notebook data 24 (ST1405). If both match each other (YES), processing goes to ST1406. If both do not match each other (NO), processing is ended. If no password is registered in ST1403 (NO), processing also goes to ST1406.

On the other hand, if the result is "NO" in ST1401, the user receives the direct input of IP address of the destination using a key provided at the control panel section 25 (ST1407) and processing goes to ST1406.

In ST1406, the scanner section 11 of network scanner 2 scans the document and obtains image information. Sequentially, the image file generating section 12 converts image information to an image file with a TIFF format (ST1408). After that, the network scanner 2 transfers the image file to PC3 as a specified destination according to the foregoing Lpr/Lpt protocol (ST1409). In PC3 that has received the image file, the image file storage processing section 39 stores the image file to the storage section 15 (ST1410).

As explained above, according to the present embodiment, PC3 merely starts up the network scanner controller application 31 or the user carries out the search starting action, so that the user can automatically register user terminal information including the IP address of PC3 to the network scanner 2 without examining the IP addresses of PC3 and network scanner 2. This makes it possible for the user to easily register user terminal information of PC3 to the network scanner 2 without fail even if the user has a poor knowledge of the PC or network. After finishing the registration, the IP address of destination is called up from address notebook data 24 of the network scanner 2 to instruct the scanner section 11 to scan the document, so that image information can be transmitted to PC3 and stored. This makes it possible to save time and effort to input the IP address at a document scanning time.

Moreover, information "Password" is included in user terminal information to be included in the registration packet 80. Then, the IP address and password are registered to address notebook data 24 of the network scanner 2 to be associated with each other. The checking of passwords is performed (ST1403 to ST1405) before the start of scanning the document (ST1406) as illustrated in FIG. 14, and the scanning of document is allowed only when the passwords match each other. This makes it possible to prohibit the image file to be freely transmitted to PC3.

Still moreover, information "USER" is included in user terminal information of registration packet 80 and the IP address and user name are registered to address notebook data 24 of the network scanner 2 to be associated with each other. For this reason, the user can call up the IP address from address notebook data 24 based on the user name in place of the IP address, which is identified with difficulty at the document scanning time, so that the operation can be easily carried out.

Still moreover, in ST1305 of FIG. 13, if the user names specified in the registration packet 80 already exist in address notebook data 24, their passwords are compared with each other (ST1208). Then, user terminal information is overwritten only when both match each other, and this prevents correct user terminal information from disappearing due to erroneous overwriting.

Still moreover, information "Group" is included in the search packet 60 and registration packet 80 so that the response and registration are carried out only when the network scanner 2 and PC3 belong to the same group. Resultantly, for example, a plurality of network scanners 2 is provided at one office so that these network scanners 2 can be selectively used according to the group to which the user belongs. Also, this eliminates the user having to have consciousness about this selective use at the time of registering user information.

This invention may be conveniently implemented using a conventional general purpose digital computer or microprocessor programmed according to the teachings of the present specification, as will be apparent to those skilled in the computer art. Appropriate software coding can readily be prepared by skilled in programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

As explained above, according to the present invention, the user terminal apparatus broadcasts the search signal, recognizes the IP address of the scanner apparatus from the response signal, which responds to the search signal and which is transmitted from the scanner apparatus. Then, the user terminal apparatus transmits user terminal information including the IP address of user terminal apparatus to the IP address of the scanner apparatus to the scanner apparatus, whereby making it possible to instruct the scanner apparatus to register user terminal information. Resultantly, the user can easily register user terminal information to the scanner apparatus without fail even if the user has a poor knowledge of IT (Information Technology). After finishing the registration, the IP address of destination is called up from memory of the scanner apparatus to instruct the scanner apparatus to scan the document, so that image information can be transmitted to the user terminal apparatus to which this IP address is assigned and can be stored. This makes it possible to save time and effort to input the IP address at a document scanning time.

The present invention is not limited to the above described embodiment, and various variations and modifications may be possible without departing from the scope of the present invention.

This application is based on the Japanese Patent Application No. 2001-026646 filed on Feb. 2, 2001, entire content of which is expressly incorporated by reference herein.

What is claimed is:

1. A scanner apparatus configured to scan image data, comprising:
   an interface configured to be connected to a terminal apparatus via a network; and
   a controller comprising:
      a search packet receiver configured to receive, from the terminal apparatus, a search packet, the search packet being utilized to search for a scanner apparatus to be connected to the terminal apparatus, the search packet including identification information, the identification information identifying the terminal apparatus;
      a determiner configured to determine whether the identification information of the search racket matches identification information of the scanner apparatus;
      a response transmitter configured to transmit, to the terminal apparatus, a response to the search packet when it is determined that the identification information of the search packet matches the identification information of the scanner apparatus;
      a receiver configured to receive, from the terminal apparatus, terminal information, the terminal information including an IP address of the terminal apparatus, after the response to the search packet is transmitted to the terminal apparatus; and
      a transmitter configured to transmit, to the terminal apparatus, the scanned image data, based on the IP address of the terminal apparatus included in the received terminal information.

2. The scanner apparatus according to claim 1 further comprising a memory configured to store data and an input configured to input information,
   wherein the terminal information includes a password associated with the IP address of the terminal apparatus, the controller stores the IP address of the terminal apparatus and the password associated with the IP address of the terminal apparatus in the memory, the controller obtains, from the memory, the IP address of the terminal apparatus associated with the password when a user of the scanner apparatus inputs the password via the input, and the transmitter transmits, to the terminal apparatus, the scanned image data, based on the obtained IP address of the terminal apparatus.

3. The scanner apparatus according to claim 1 further comprising a memory configured to store data and an input configured to input information,
wherein the terminal information includes a user name of the terminal apparatus associated with the IP address of the terminal apparatus, the controller stores, in the memory, the IP address of the terminal apparatus and the user name of the terminal apparatus associated with the IP address of the terminal apparatus, the controller obtains, from the memory, the IP address of the terminal apparatus associated with the user name of the terminal apparatus when a user of the scanner apparatus inputs the user name of the terminal apparatus via the input, and the transmitter transmits, to the terminal apparatus, the scanned image data, based on the obtained IP address of the terminal apparatus.

4. A terminal apparatus, comprising:
an interface configured to be connected to a scanner apparatus via a network; and
a controller comprising:
a search packet transmitter configured to transmit, to the scanner apparatus, a search packet utilized to search for a scanner apparatus to be connected to the terminal apparatus, the search packet including identification information, the identification information identifying the terminal apparatus;
a response receiver configured to receive, from the scanner apparatus, a response to the search packet, the response including an IP address of the scanner apparatus, when the scanner apparatus determines that the identification information of the search packet matches identification information of the scanner apparatus;
a transmitter configured to transmit terminal information to the scanner apparatus, based on the IP address of the scanner included in the response, the terminal information including an IP address of the terminal apparatus; and
a receiver configured to receive the scanned image data from the scanner apparatus, the scanned image data being transmitted to the terminal apparatus, based on the IP address of the terminal apparatus included in the transmitted terminal information.

5. The terminal apparatus according to claim 4, wherein the terminal information includes the IP address of the terminal apparatus and a password associated with the IP address of the terminal apparatus.

6. The terminal apparatus according to claim 4, wherein the terminal information includes the IP address of the terminal apparatus and a user name of the terminal apparatus associated with the IP address of the terminal apparatus.

7. An image information transmitting system, comprising:
a scanner apparatus configured to scan image data; and
a terminal apparatus configured to be connected to the scanner apparatus via a network,
the scanner apparatus further comprising:
a search packet receiver configured to receive, from the terminal apparatus, a search packet utilized to search for a scanner apparatus to be connected to the terminal apparatus, the search packet including identification information, the identification information identifying the terminal apparatus;
a determiner configured to determine whether the identification information of the search packet matches identification information of the scanner apparatus;
a response transmitter configured to transmit, to the terminal apparatus, a response to the search packet when it is determined that the identification information of the search packet matches the identification information of the scanner apparatus;
a receiver configured to receive, from the terminal apparatus, terminal information, the terminal information including an IP address of the terminal apparatus, after the a response to the search packet is transmitted to the terminal apparatus; and
a transmitter configured to transmit, to the terminal apparatus, the scanned image data, based on the IP address of the terminal apparatus included in the received terminal information.

8. A method for registering an IP address of a terminal apparatus in a scanner apparatus, the terminal apparatus being connected to the scanner apparatus via a network, the scanner apparatus scanning image data, the method comprising:
receiving, at the scanner apparatus from the terminal apparatus, a search packet utilized to search for a scanner apparatus to be connected to the terminal apparatus, the search packet including identification information, the identification information identifying the terminal apparatus;
determining whether the identification information of the search packet matches identification information of the scanner apparatus;
transmitting, from the scanner apparatus to the terminal apparatus, a response to the search packet when it is determined that the identification information of the search packet matches the identification information of the scanner apparatus;
receiving, at the scanner apparatus from the terminal apparatus, terminal information, the terminal information including an IP address of the terminal apparatus, after the response to the search packet is transmitted to the terminal apparatus;
registering, in the scanner apparatus, the IP address of the terminal apparatus included in the received terminal information; and
transmitting, from the scanner apparatus to the terminal apparatus, the scanned image data, based on the registered IP address of the terminal apparatus.

9. The scanner apparatus according to claim 1, wherein the response transmitter does not transmit, to the terminal apparatus, the response to the search packet, when the identification information of the search packet does not match identification information of the scanner apparatus.

10. The scanner apparatus according to claim 1, wherein the identification information identifying the terminal apparatus comprises a group name of the terminal apparatus, and the response transmitter transmits, to the terminal apparatus, the response to the search packet, when the group name of the search packet matches a group name of the scanner apparatus.

11. The terminal apparatus according to claim 4, wherein the response receiver does not receive from the scanner apparatus, the response to the search packet, when the identification information of the search packet does not match identification information of the scanner apparatus.

12. The terminal apparatus according to claim 4, wherein the identification information identifying the terminal apparatus comprises a group name of the terminal apparatus, and the response receiver receives from the scanner apparatus, the response to the search packet, when the group name of the search packet matches a group name of the scanner apparatus.

13. The system according to claim 7, wherein the response transmitter does not transmit, to the terminal apparatus, the response to the search packet, when the identification information of the search packet does not match identification information of the scanner apparatus.

14. The system according to claim 7, wherein the identification information identifying the terminal apparatus comprises a group name of the terminal apparatus, and the response transmitter transmits, to the terminal apparatus, the response to the search packet, when the group name of the search packet matches a group name of the scanner apparatus.

15. The scanner apparatus according to claim 1, wherein the search packet receiver is configured to receive a search packet that is broadcast by the terminal apparatus.

16. The terminal apparatus according to claim 4, wherein the search packet transmitter is configured to broadcast a search packet.

17. The system according to claim 7, wherein the search packet receiver is configured to receive a search packet that is broadcast by the terminal apparatus.

* * * * *